INVENTOR
RICHARD A. FRAZER

LASER TRACKING

LASER RANGING

United States Patent Office 3,615,135
Patented Oct. 26, 1971

3,615,135
LASER RANGING WITH POLARIZATION MODULATION
Richard A. Frazer, King George, Va., assignor to the United States of America as represented by the Secretary of the Navy
Filed May 16, 1969, Ser. No. 825,225
Int. Cl. G01c 3/08
U.S. Cl. 356—5                                              7 Claims

ABSTRACT OF THE DISCLOSURE

This invention is a ranging and tracking system which utilizes a laser. In the system the laser beam is passed through a modulator to a target. The beam is directed by a tracking mirror which also gathers the reflections of the beam. The reflected beam is directed to a tracking photomultiplier which converts the reflections to an electrical error signal and uses it to drive the tracking mirror. The reflected beam is also passed through a polarization analyzer to a range photomultiplier which triggers a range counter to stop counting. Initially, a pulsing circuit is operative to simultaneously pulse the modulator and start the range counter. The modulator shifts the polarization angle of a selected portion of the laser beam and the polarization analyzer will pass only that portion of the beam which has the shifted polarization angle.

STATEMENT OF GOVERNMENT INTEREST

The invention described herein may be manufactured and used by or for the Government of the United States of America for governmental purposes therefor.

BACKGROUND OF THE INVENTION

Field of the invention

This is directed to the field of target ranging and tracking. More particularly, this invention is directed to ranging and tracking system which utilizes a laser.

Description of the prior art

Ranging devices which utilize continuous wave lasers are known in the prior art. However, there are no known devices which utilize a laser for tracking a target as well as for obtaining range information.

The prior art laser ranging devices are not suited for tracking. These devices utilize polarizers at the output of the laser modulator. These analyzers pass only plane-polarized light and therefore reduce the power of the transmitted beam. This reduction in power can result in loss of the target by the tracking circuit. In addition, with these devices, the ranging photodetector will detect unpolarized ambient light (noise) and polarized solar radiation which can mask the signal reflected from the target and cause premature triggering of the range counter. Finally, the low level of transmitted power in the prior art ranging systems hinders visual alignment of the ranging apparatus.

SUMMARY OF THE INVENTION

This invention represents a significant advance over the prior art. The inventive apparatus utilizes a laser for both tracking and ranging. The inventive apparatus transmits the full power of the modulated laser beam to the target. It substantially eliminates the effects of ambient light and solar radiation.

The inventive apparatus directs a laser beam through a modulator to a tracking mirror which both directs the laser beam to a target and gathers the reflections of the beam. These reflections are then directed to two photomultipliers. The inventive system advantageously places a polarization analyzer in front of the ranging photomultiplier alone. This allows the full power of the laser beam to be directed to the target and to be received by the tracking photomultiplier for use in aligning the tracking mirror. At the same time the analyzer placement is such that when the modulator is pulsed to start the ranging count, only that portion of the laser beam that is modulated and reflected by the target will pass to the ranging photomultiplier to stop the ranging count. All ambient light and solar radiation lying outside the bandpass of the analyzer is attenuated. This arrangement also facilitates visual alignment of the tracking mirror by use of an associated telescope.

It is an object of the present invention to provide a laser ranging apparatus which is substantially unaffected by solar radiation and ambient light.

It is a further object of the present invention to provide an apparatus which utilizes a laser for ranging and tracking.

It is a still further object of the present invention to provide a laser ranging and tracking apparatus wherein the full power of the laser beam is transmitted to its target.

Other objects, advantages and novel features of the invention will become apparent from the following detailed description of the invention when considered in conjunction with the accompanying drawings.

DESCRIPTION OF THE PREFERRED EMBODIMENTS

Figure 1:
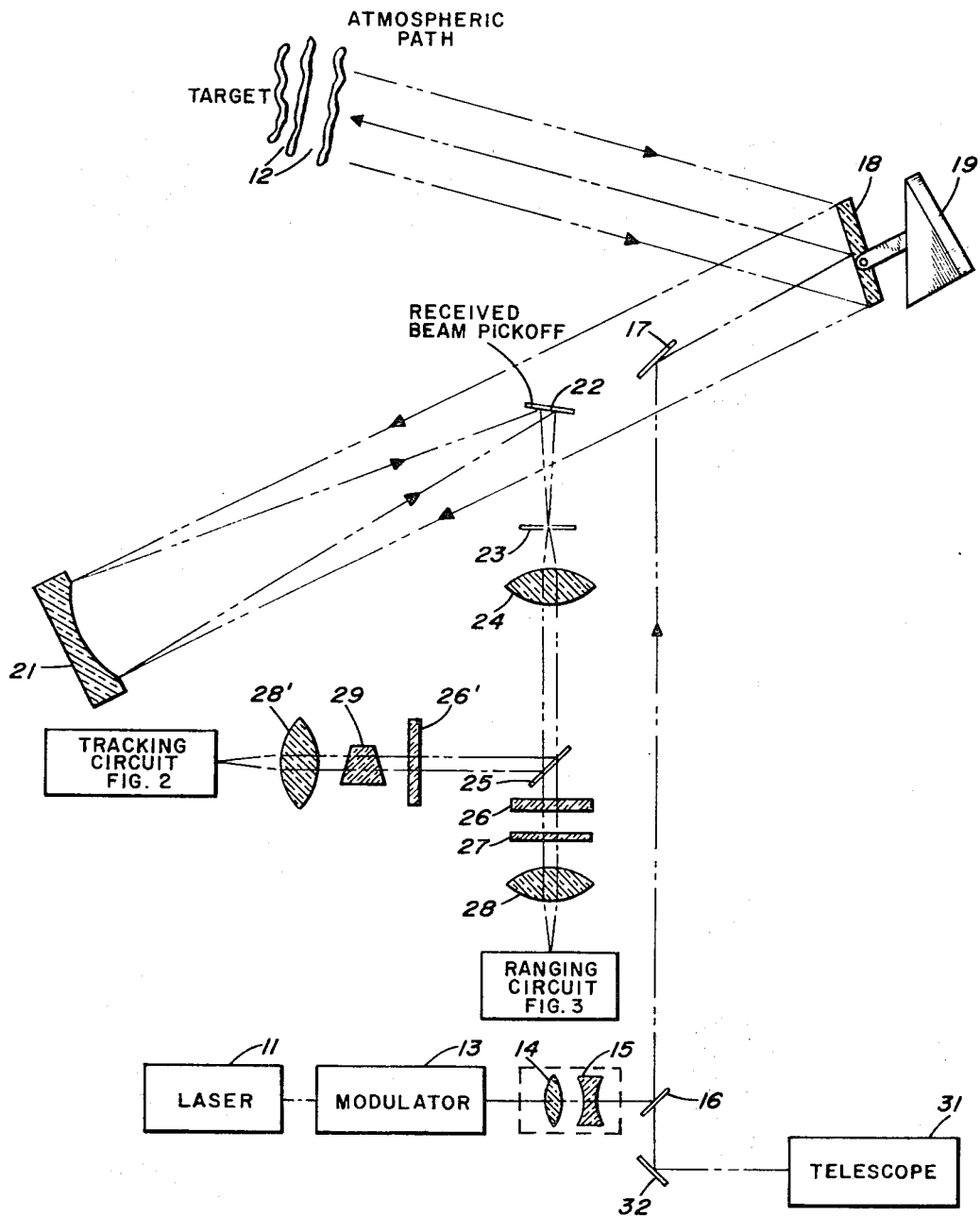
FIG. 1 shows the optic path of the inventive apparatus.
Figure 2:
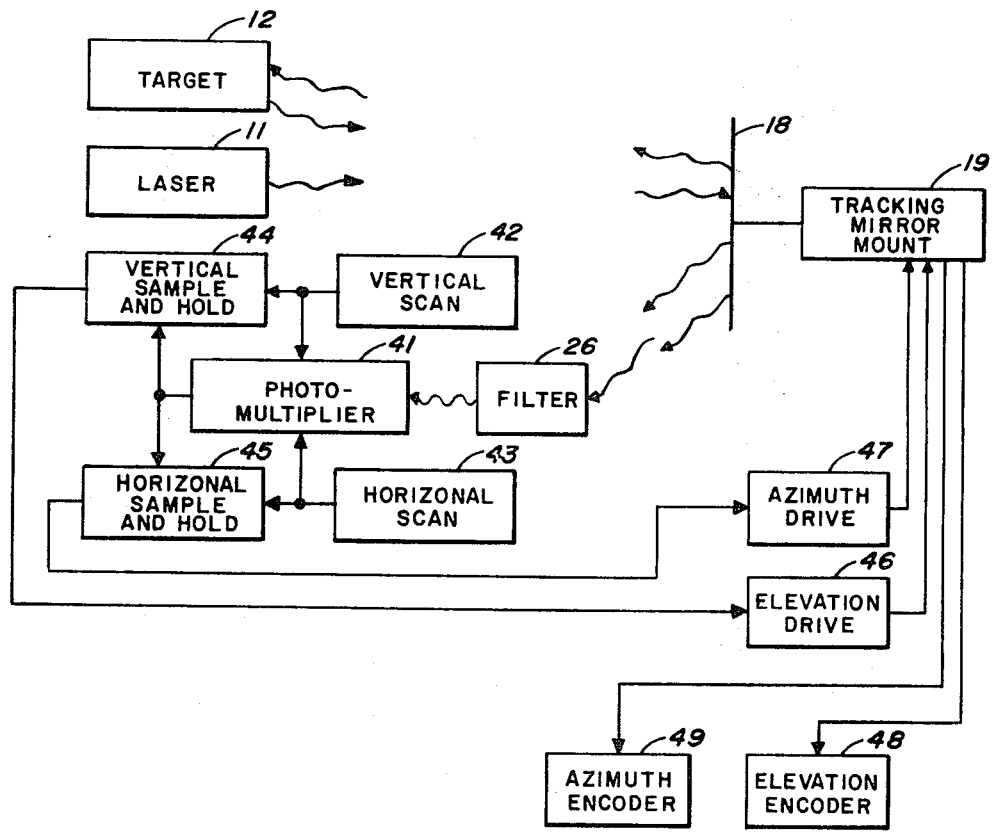
FIG. 2 is the tracking circuit.

Referring now to the drawings and in particular FIGS. 1 and 2, the optical path of the inventive tracker/ranger is set out. The system utilizes a laser 11 to direct a beam of coherent light to the target 12. This beam is passed through a modulator 13 where its polarization angle can be shifted.

Any continuous width laser can be used in the inventive tracker. The only limitation placed is that the output beam must be comprised of plane-polarized light. This can be achieved by utilizing polarizing optics with an ordinary continuous wave laser or by utilizing a laser which exclusively produces this type of light.

The modulator may be, for example, a Pockel or a Kerr cell. It operates in conjunction with the ranging circuit to impose intermittent ranging pulses on the transmitted beams. When these pulses are not applied to the modulator, the beam passes unmodulated to the target.

The beam is narrowed by a pair of shaping lenses 14 and 15 and is reflected by a dichroic mirror 16. The beam is further reflected at 17 to the tracking mirror 18. The tracking mirror is moved by mount 19 which is in turn controlled by signals from the tracking circuit, FIG. 2. The tracking mirror directs the laser beam to the target 12 and gathers the subsequent reflections. The signals from the tracking circuit to the tracking mount 19 cause the movement of the mirror to follow the path of the target.

The reflections gathered by the tracking mirror 18 are directed to a parabolic mirror 21 which concentrates and focuses them onto pick-up mirror 22. This beam is then narrowed by field stop 23 and passed through relay lens 24 to a beam splitter 25.

Figure 3:
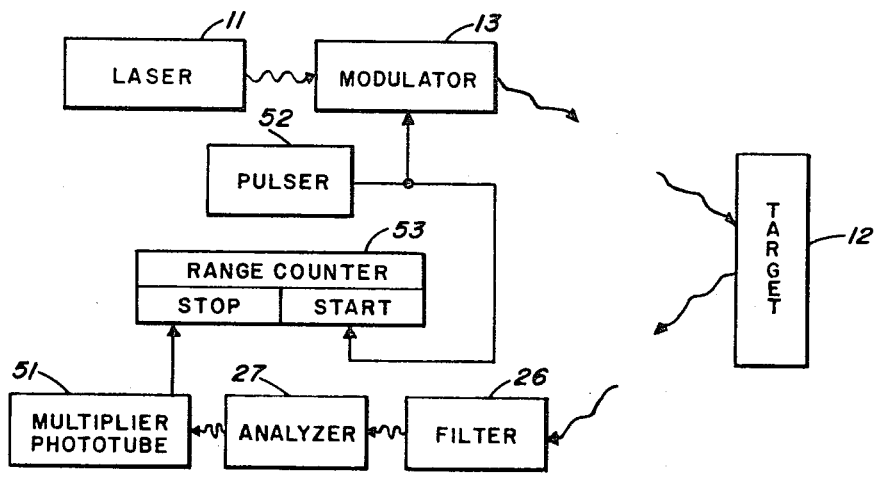
FIG. 3 is the ranging circuit.

One path of the beam then is directed through interference filter 26, polarization analyzer 27 and focusing lens 28 to the ranging circuit, FIG. 3. The other path of the beam is directed through interference filter 26', dove prism 29 and focusing lens 28' to the tracking circuit, FIG. 2.

The polarization analyzer passes only that light which has the polarization angle applied to the laser beam by the modulator 13. It attenuates all other light and insures that the ranging circuits receive only the modulated light which is supplied at the output of the modulator. The placement of the analyzer eliminates most of the unpolarized background noise and the highly polarized solar radiation. In the prior art the analyzer was placed at the output of the modulator and as a consequence a high incidence of background noise and solar radiation was detected by the ranging circuits.

The level of the light reflected by the target varies with its position and in some instances it will be very low. If the effects of noise and solar radiation are not substantially eliminated, they will be greater than the light reflected by the target in the low reflection levels and will consequently cause the ranging circuit to be prematurely triggered and give an inaccurate reading. In the prior art circuits this often resulted.

The increased level of transmission in the inventive system also facilitates visual alignment of the tracking mirror and target. Telescope 31 and mirror 32 are provided for this.

Referring now to the operation of the inventive system, the tracking circuit is shown in FIG. 2. The circuit utilizes a scannable photo-multiplier tube with horizontal and vertical scan coils 42 and 43. The output of the scan coils is fed through two sample and hold amplifiers 44, 45 to the azimuth and elevation drives 46, 47 for tracking mirror mount 18. Position output signals are supplied by mount 19 to azimuth and elevation encoders 48, 49.

Initially, tracking mirror 18 is aligned by external azimuth and elevation controls, not shown, connected to azimuth and elevation drives 46 and 47. The alignment data may be obtained from the known trajectory of the target or it may be visually acquired through use of telescope 31.

When the target is acquired, the reflected laser beam will be filtered by interference filter 26' and focused through dove prism 29 and lens 28' onto photomultiplier 41. Filter 26' has a bandwidth which is preferably as narrow as the laser bandwidth. Similarly, the photomultiplier 41 is responsive at the laser bandwidth.

When the azimuth of the tracking mirror is rotated, the $x$ and $y$ axis of the image appearing on the surface of the photosensitive surface would normally also rotate. Dove prism 29, however, is geared to the tracking mount 18 and rotates in an opposite direction to compensate for this effect. The use of the dove prism eliminates the need to rotate the photomultiplier and the horizontal and vertical outputs of circuits 44, 45 will always correspond to the azimuth and elevation axes.

When the reflections from the target 12 are focused onto the photocathode of the photomultiplier 41 by lens 28', an electron stream is set up in the tube. Horizontal and vertical reflecting coils associated with scan circuits 42 and 43 focus this stream onto an aperture in the tube's masking electrode. At this occurrence the photomultiplier will turn on the sample and hold circuits 44 and 45.

The current in the coils is proportional to the target's position in space and this current is sensed by the horizontal and vertical sample and hold circuits. When the electron stream moves off the aperture in the mashing electrode, circuits 44 and 45 revert to the hold mode and hold the sampled signal. The aperture of this circuit is explained in greater detail in patent application Ser. No. 828,099, filed concurrently with this case by the present inventor, Eugene P. Stemple and Conrad W. Brandts.

The signals sampled by circuits 45 and 44 are fed to the azimuth and elevation drives 47 and 46 of tracking mirror 19. Here the signals are compared with signals representative of the azimuth and elevation of the target 12. If a difference signal is obtained it is fed to servos associated with the tracking mount 19 to correct the position of the mirrors.

The position voltages are also fed to encoders 48 and 49. These encoders translate the voltages into a digital reading which is representative of the target's elevation and azimuth.

The target's range is determined by the circuit shown in FIG. 3. The ranging circuit utilizes a photomultiplier tube 51, a pulser 52 and a counter 53.

The ranging circuit is triggered after laser operation has been initiated and the tracking of the target is underway. Pulser 52 is triggered to initiate ranging operation. The pulser sends a start pulse to range counter which then begins counting. The same pulse is used to activate modulator 13. The modulator shifts the polarization angle of the laser beam and remains on for the duration of the pulse. It has no effect on the wavelength of the laser beam.

The laser beam now consists of a continuous beam which has a change in its polarization angle over the length of the pulse from the pulser circuit 52. The laser beam with this change is then reflected off the target and focused on the range and tracking photomultiplier.

The laser beam is then filtered at 26 and the modulated portion of the beams is then passed through analyzer 27 to the photosensitive surface of photomultiplier 51. The photomultiplier utilized is the RCA-7102 multiplier phototube. It amplifies the modulated signal and feeds it to the counter to stop the counting operation. The recording of the counter is then utilized as a measurement of the target's range.

The modulated portion of the laser beam will have no effect on the output of the tracking circuit because tracking photomultiplier 41 will be responsive to all light of the same wavelength as the laser.

Analyzer 27 is operative to attenuate all light which does not have the same polarization angle as that imparted by modulator 27. The analyzer removes almost all the unpolarized background light or noise, as it is sometimes called, as well as most of the ambient polarized solar reflections. The analyzer insures that photomultiplier 51 does not stop counter 53 until it receives the light modulated at 13 when pulser 52 started the counter.

The placement of the analyzer also insures that the tracking circuit will receive the full power of the transmitted laser beam. If the analyzer were placed at the output of the modulator, the transmitted power which would reach the tracking circuit would be considerably reduced, and in low light level conditions this would result in the loss of the target by the tracker.

Thus, a new and improved ranging and tracking apparatus has been described. The inventive apparatus utilizes a laser with its attendant advantages. The inventive system also utilizes a polarizer with a photodetector to overcome the effects of background light and solar reflections.

Having described such an apparatus it is apparent that modification and variations are possible in light of the above teachings. Thus, by way of example, a semiconductor laser may be used at 11 and the modulating pulse from 52 imposed on the laser pumping pulse to eliminate modulator 13.

What is claimed is:
1. An apparatus for obtaining target range comprising:
    a laser for transmitting a beam of coherent light to a target;
    a modulator for receiving the output beam of coherent light from said laser and operable upon receipt of a pulse from a pulsing circuit to shift the polarization angle of said light beam only during the time of the existence of said pulse;
    a pulsing circuit connected to said modulator;
    a first photodetector mounted adjacent to said laser for receiving the reflections of said beam of coherent light from said target;

a polarizer mounted in front of said photodetector for attenuating that light which does not have the same polarization angle as that imparted to the beam of coherent light by the modulator;

a counter connected to said pulsing circuit to receive a start signal and connected to said photodetector to receive a stop signal;

a tracking mirror for directing said beam of polarized coherent light to said target;

a second photodetector mounted adjacent to said first photodetector for receiving the reflections of said beam of coherent light from said target; and a tracking circuit connected to said second photodetector and said tracking mirror to position said tracking mirror in response to the output of said photodetector.

2. An apparatus as in claim 1 further comprising:

a parabolic mirror mounted adjacent to said tracking mirror;

said tracking mirror being adapted to receive the reflection of said polarized beam of coherent light and to direct said reflection to said parabolic mirror; and said parabolic mirror being adapted to concentrate said reflections and to direct them to said first and second photodetectors.

3. An apparatus as in claim 2 further comprising a beamsplitter mounted adjacent to said photodetector for splitting the reflection of said beam of polarized light and for directing them to said first and second photodetectors.

4. An apparatus as in claim 3 further comprising telescope means mounted to view said target along said beam of coherent polarized light.

5. A method for ranging and tracking a target with a tracking mirror and a beam of coherent polarized light comprising the steps of:

simultaneously transmitting said beam of coherent polarized light to a target by said tracking mirror and starting a count;

attenuating the reflections gathered by the tracking mirror whose polarization differs from that of said beam of polarized coherent light;

detecting the unattenuated reflections of the beam of coherent light from said target; and stopping the count upon receipt of the unattenuated reflections of the beam of coherent light from said target.

6. A method as in claim 5 further comprising the steps of modulating said beam of coherent light.

7. A method as in claim 6 further comprising the steps of:

detecting the reflections of the beam of coherent light from said target before they have been attenuated; and directing the beam of coherent light to the target in response to the unattenuated detection.

References Cited

UNITED STATES PATENTS

| | | | |
|---|---|---|---|
| 3,229,223 | 1/1966 | Miller | 350—150 |
| 3,480,368 | 11/1969 | Erf et al. | 356—4 |
| 3,503,682 | 3/1970 | Botcherby | 356—4 |

RODNEY D. BENNETT, JR., Primary Examiner

S. C. BUCZINSKI, Assistant Examiner

U.S. Cl. X.R.

250—199; 356—29